July 14, 1953 E. CRANE 2,644,981
POULTRY SHACKLE
Filed Oct. 12, 1948 2 Sheets-Sheet 1
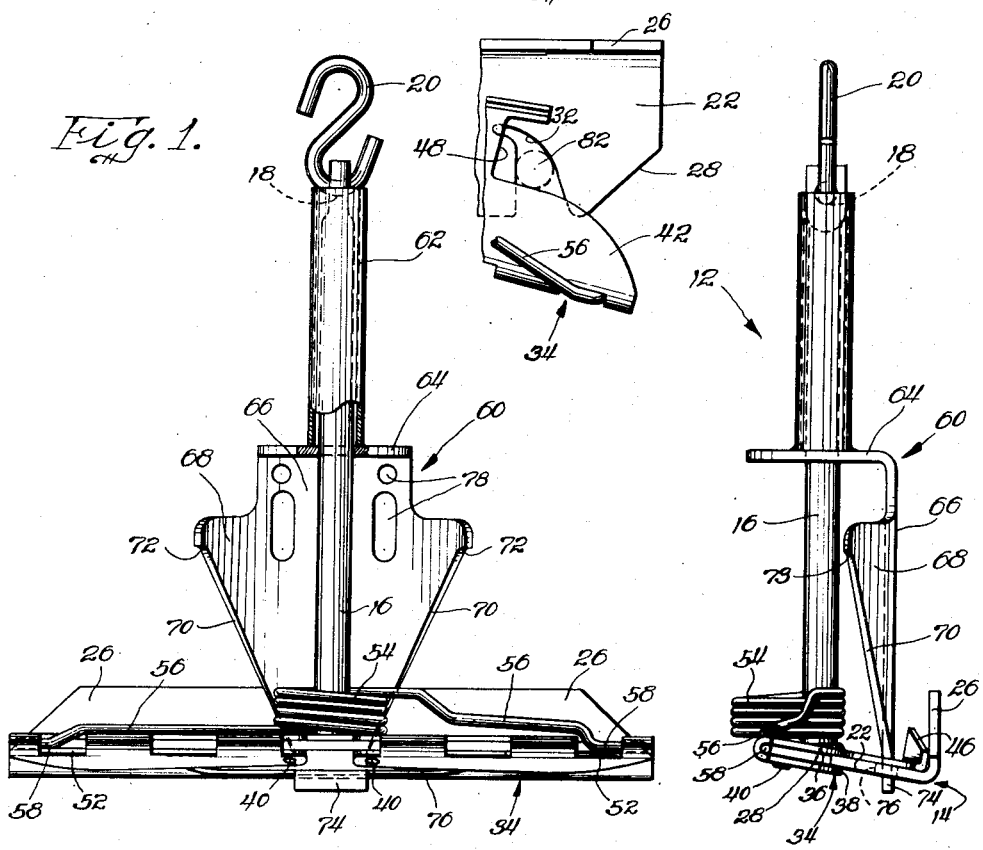
Inventor:
Edward Crane.
By Bair + Freeman
Attys

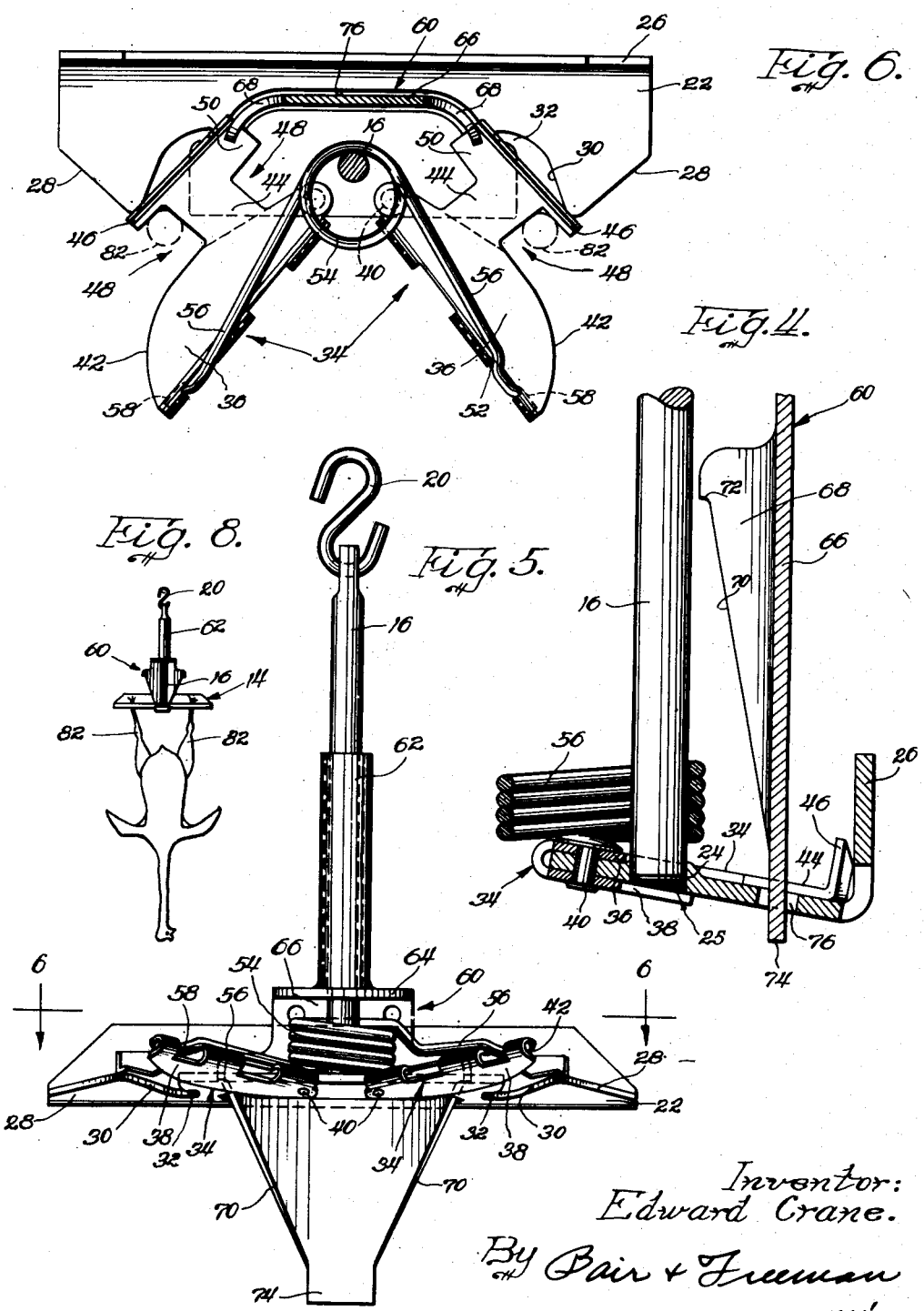

Patented July 14, 1953

2,644,981

UNITED STATES PATENT OFFICE 2,644,981

POULTRY SHACKLE

Edward Crane, Ottumwa, Iowa, assignor to Barker Poultry Equipment Co., Ottumwa, Iowa, a corporation of Iowa Application October 12, 1948, Serial No. 54,009

7 Claims. (Cl. 17—44.1)

This invention relates to a shackle for holding fowl during a picking operation.

The shackle of the present invention is included in that general type which suspends the fowl by the legs in head-down position, and is mounted for carrying the fowl through a picking machine.

An object of the present invention is the provision of a shackle in which the fowl can be quickly inserted.

Another object is the provision of a shackle having a construction whereby the legs of the fowl can be inserted merely by forcing the legs inwardly from opposite ends of the shackle.

Another object is the provision of a shackle from which the fowl can be easily and quickly released.

A further object of the invention is the provision of a shackle having a pair of horizontally swingable leaves movable into and out of leg-gripping position, which are movable to leg-releasing position by a single vertically movable wedge shape member.

A still further object is the provision of a shackle from which the legs of the fowl are positively ejected from gripped position in the releasing operation of the fowl.

Another object is the provision of a shackle having a special construction whereby the legs of the fowl are held in substantially vertical position, as contrasted to previous objectionable shackles in which the legs were held at a wide angle to each other.

Still another object is the provision of a shackle in which the legs of the fowl are held in tightly wedged position.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a front view of the shackle of the present invention shown in closed position.

Figure 2 is a view from the right of Figure 1.

Figure 3 is a top view of Figure 1.

Figure 4 is an enlarged fragmentary sectional view taken on line 4—4 of Figure 3.

Figure 5 is a front view of the shackle in open position.

Figure 6 is a view taken on line 6—6 of Figure 5.

Figure 7 is an enlarged fragmentary view similar to the right end of Figure 3 showing the positions of the parts when the leg of a fowl is gripped in the shackle.

Figure 8 is a diagrammatic illustration from the front of the shackle showing a fowl gripped and held thereby.

Referring in detail to the drawings, the shackle is shown as a whole at 12 and includes a base 14 and stem 16. The stem 16 furnishes the means for supporting the shackle, and its upper end is provided with a hole 18 for receiving a hook element 20 for hooking or suspending the shackle from a conveyor. As is usual in picking chickens or other fowl, a number of shackles are suspended from a conveyor and carried through a picking machine, and fowl suspended from the shackles are subjected to a picking operation.

The base 14 includes a plate-like bottom element 22 having an opening 24 for receiving the lower end of the stem 16. The stem may be secured in the hole by means of solder, such as generally indicated at 25, or other convenient means. The stem is disposed substantially centrally longitudinally on the base and positioned adjacent one edge, which for convenience will be termed the front edge. The flat portion 22 of the base slopes slightly downwardly toward the rear, and at the rear of the flat portion 22 is an up-turned flange 26.

Inclined surfaces or edges 28 are formed on the base 14 at the ends adjacent the front corners. The surfaces 28 incline toward each other and toward the front edge of the base. Disposed adjacent each inclined edge 28 is a notch 30 which opens out of the front edge of the base. The notch 30 tapers inwardly and terminates in inturned portions 32. It will be noted that the notches 30 are spaced outwardly somewhat from the center of the base and the stem 16.

A pair of leaves 34 are secured to the base 14 in a manner to be presently described. The two leaves 34 are symmetrical and therefore a description of one will serve for both.

Each leaf 34 includes a top flat portion 36 and a portion 38 turned back under the top portion. One end of the leaf is pivoted at 40 to the base by means of a rivet, with the top and bottom portions of the leaf disposed above and below the front edge of the base. The two leaves 34 are pivoted for horizontal swinging movement, their pivot points being adjacent the stem 16 and the swinging ends of the leaves extending opposite from each other, longitudinally of the base.

The rear edge of each leaf is curved forwardly as indicated at 42. Each leaf contains a laterally extending portion 44 extending rearwardly from the leaf. At the rear edge of the lateral extension 44 is an up-turned flange 46 which extends outwardly toward the swinging end of the leaf a greater distance than the lateral portion 44, forming a notch 48 in which the curved edge 42 terminates.

The lateral etxension 44 has another portion 50 which extends toward the center of the base.

The front edges of the leaves 34 are provided with notches 52. A coil spring 54 surrounds the stem 16 and its ends 56 have bent portions 58 which are inserted in the notches 52. The spring 54 is so constructed as to bias the leaves 54 away from each other or toward the positions illustrated in Figures 1 and 3. The upper and lower turned-over portions of the leaves slide over the upper and lower surfaces of the portion 22 of the base and are thereby limited from furher movement when the leaves engage the front edge of the base.

A spade or wedge element 60 is slidably mounted on the stem 16. The spade includes an upper tubular member 62 which forms the immediate means for mounting on the stem. The upper end of the stem 16 is so shaped that the tubular member 62 can be slid off of the stem when the hook 20 is removed therefrom and it is intended that the hook is so removable for that purpose. The wedge member includes a turned over horizontal portion 64 having a hole for receiving the stem 16 and is secured to the tubular member 62 as by solder or the like. The turned over portion 64 may be formed intergal with the main portion of the spade or wedge member; the latter includes a verically disposed back portion 66 which may be generally flat. The back portion 66 has side wedging elements 68 which are curved forwardly from the back portion 66 about vertical axes, as shown in Figures 3 and 6. The side wedge elements 68 have wedging surfaces 70 which converge downwardly and are formed with downwardly facing shoulders 72 at their upper ends. The lower end of the wedge element terminates in a reduced portion 74 having substantially vertical edges and received in an opening 76 in the base element. Holes, such as 78, may be formed in the upper part of the back portion 66 of the spade for securement of hook means for holding the head of the fowl up from its normally depending position.

Figure 3 shows to best advantage the position of the various parts when the shackle is empty. In such a position the leaves 34 are biased to a fixed position or closed position with respect to the base. In this position the curved portions 42 of the leaves cross the inclined portions 28 of the base forming index notches 80 which open outwardly from opposite ends of the shackle. The operator grasps the fowl with one leg in each hand and places the shanks of the legs in the index notches 80 as indicated at 82. He then presses inwardly on the shanks of the legs of the fowl from opposite ends of the shackle. When the legs of the fowl initially contact the surfaces 42 and 28, the leaves 34 are in the position illustrated in Figure 3. The surfaces 42 and 28 form interreacting surfaces for opening the leaves. Continued inward movement of the legs of the fowl forces the leaves 34 to swing outwardly, moving the notches 48 outwardly, and the legs of the fowl fall into the notches. At this point, which is just before reaching the position illustrated in Figure 6, the legs are also in alignment with the notches 30, and when the legs reach this point, the spring 54 biases the leaves back to closed or operative position and carries the legs into the notches 30. Such a position is shown in Figure 7. The notches 30 converge inwardly so that when the legs of the fowl are carried into the notches, the legs are firmly gripped and held therein. For purposes of convenience in interpretating the claims, it may be pointed out here that the notches 30 are disposed in the arcuate paths of the notches 48, and accordingly the notches in the leaves and the base come into substantial register with each other when the leaves are moved to operative position.

The spade or wedge means 60 is considered a novel means for releasing the fowl from the shackle. At the desired point along the line of travel of the conveyor any convenient means may be employed for forcing the spade downwardly, and therefore a disclosure of such a means is not deemed necessary here. Suffice it to say that such a means engages the turned-over portion 64 of the spade.

Upon downward movement of the spade the wedging surfaces 70 engage the portions 50 of the leaves. The opening 76 in the base is long enough to accommodate the widest dimension of the surfaces 70 and is curved to accommodate the curvature of the side wedge elements 68. The wedging surfaces 70 on engaging the portions 50 of the leaves swing the leaves outwardly from the front edge of the base. The flange 46 forms the rear defining edges of the notches 48 and acts as ejecting means for forcing the legs of the fowl out of the notches 30. Figure 6 shows the positions of the various parts at the completion of the ejecting operation. The shoulders 72 limit the downward movement of the spade.

An advantage of the shackle of the present invention will now be evident. The fowl can be gripped in the shackle by a simple operation of forcing inwardly on the legs of the fowl on opposite ends of the shackle. Both legs are gripped at the same time and each furnishes a reaction for the other so that the shackle need not be otherwise held in position.

Attention is directed to Figure 8 wherein it will be seen that the legs of the fowl are disposed substantially vertically, or in that position which is normal to the fowl. This is in contrast to objectionable previous types of shackles, the legs of the fowl are held at a wide angle with respect to each other. When the legs are held at a wide angle, as explained, the fowl is subject to injury.

While I have herein shown and described a preferred embodiment of my invention, manifestly it is susceptible to modification and rearrangement of the parts without departing from the spirit and scope thereof. I do not, therefore, wish to be understood as limiting my invention to the precise form herein disclosed, except as I may be so limited by the appended claims.

I claim as my invention:

1. A shackle comprising a base, a leaf pivoted at one end thereof on said base, said base having a notch formed therein, said leaf having a notch therein, said leaf adapted to overlap the base with the notches therein in register to receive an object to be grasped therein, means for ejecting the grasped object from the shackle, said ejecting means including a reciprocable wedge engageable with said leaf for pivoting said leaf, and an upturned flange on said leaf adapted to engage the object grasped by the shackle to eject said object from the shackle.

2. A shackle comprising a pair of elongated members one of which is pivotally connected to the other at one end thereof, said members being adapted to pivot in scissor-like fashion toward and away from each other, respectively to a closed position and away from said closed position, portions of said members overlapping in said closed position, said overlapping portions having coacting means therein adapted to receive and grasp an object, portions of said members spaced from said pivotal connection radially beyond said overlapping portions presenting coacting edges running transverse to each other so as to bound a tapered index notch whose apex points generally toward said pivotal connection, the introduction into said index notch of an object to be grasped and movement of said object toward said pivotal connection causing said members to be pivoted away from each other from said closed position to a position were the object is received and grasped by said coacting means in said overlapping portions, and a reciprocable wedge operatively associated with said members for pivoting said members away from said closed position.

3. A shackle comprising a pair of elongated members one of which is pivotally connected to the other at one end thereof, said members being adapted to pivot in scissor-like fashion toward and away from each other, respectively to a closed position and away from said closed position, portions of said members overlapping in said closed position, said overlapping portions having coacting means therein adapted to receive and grasp an object, portions of said members spaced from said pivotal connection radially beyond said overlapping portions presenting coacting edges running transverse to each other so as to bound a tapered index notch whose apex points generally toward said pivotal connection, the introduction into said index notch of an object to be grasped and movement of said object toward said pivotal connection causing one of said members to pivot away from said closed position to a position where the object is received and grasped by said coacting means in said overlapping portions, a reciprocable wedge operatively associated with said members for pivoting said one member away from said closed position, and an upturned flange on said one member adapted to engage the object grasped by the shackle as said member is pivoted, so as to eject said object from the shackle.

4. A shackle comprising a pair of elongated members one of which is pivotally connected to the other at one end thereof, said members being adapted to pivot in scissor-like fashion toward and away from each other, respectively to a closed position and away from said closed position, portions of said members overlapping in said closed position, said overlapping portions having coacting means therein adapted to receive and grasp an object, and portions of said members spaced from said pivotal connection radially beyond said overlapping portions presenting coacting edges running transverse to each other and defining a tapered index notch whose apex points generally toward said pivotal connection, said tapered index notch being separate from said coacting means for receiving and grasping an object, the introduction into said index notch of an object to be grasped and movement of said object toward said pivotal connection causing one of said members to pivot away from said closed position to a position where the object may be introduced into and received and grasped by said coacting means in said overlapping portions.

5. A shackle comprising a pair of elongated members one of which is pivotally connected to the other at one end thereof, said members being adapted to pivot in scissor-like fashion toward and away from each other, respectively, to a closed position and away from said closed position, portions of said members overlapping in said closed position, said overlapping portions having coacting means therein adapted to receive and grasp an object, portions of said members spaced from said pivotal connection radially beyond said overlapping portions presenting coacting edges running transverse to each other and defining a tapered index notch whose apex points generally toward said pivotal connection, said tapered index notch being separate from said coacting means for receiving and grasping an object, the introduction into said index notch of an object to be grasped and movement of said object toward said pivotal connection causing one of said members to pivot away from said closed position to a position where the object may be introduced into and received and grasped by said coacting means in said overlapping portions, means operatively associated with said members for biasing said members toward said closed position, and means restricting the pivoting of said members toward each other, whereby the identity of said index notch is preserved.

6. A shackle comprising a pair of elongated members one of which is pivotally connected to the other at one end thereof, said members being adapted to pivot in scissor-like fashion toward and away from each other, respectively to a closed position and away from said closed position, portions of said members overlapping in said closed position, the overlapping portions of said members each having an open ended notch formed wholly therein, said notches adapted to register and receive therein an object to be grasped, the notch in one member opening outwardly in a direction substantially radially from the axis of said pivotal connection, and the notch in the other member opening outwardly in a direction transverse to said first mentioned notch, portions of said members spaced from said pivotal connection radially beyond said overlapping portions presenting coacting edges running transverse to each other and defining a tapered index notch whose apex points generally toward said pivotal connection, said tapered index notch being separate from said notches which are adapted to register and receive and grasp an object therein, whereby the introduction into said index notch of an object to be grasped and movement of said object toward said pivotal connection causes said members to pivot from said closed position to a position where the object may be introduced into the registering notches and grasped by said members, means operatively associated with said members for biasing said members toward said closed position, and means restricting the pivoting of said members toward each other, whereby the identity of said index notch is preserved.

7. A shackle comprising a pair of elongated members one of which is pivotally connected to the other at one end thereof, said members being adapted to pivot in scissor-like fashion toward and away from each other, respectively to a closed position and away from said closed position, portions of said members overlapping in said closed position, the overlappng portions of said members each having an open ended notch formed wholly therein, said notches adapted to register and receive therein an object to be grasped, the notch in one member opening outwardly in a direction substantially radially from the axis of said pivotal connection, and the notch in the other member opening outwardly in a direction transverse to first mentioned notch, portions of said members spaced from said pivotal connection radially beyond said overlapping portions presenting coacting edges running transverse to each other so as to bound a tapered index notch whose apex points generally toward said pivotal connection, whereby the introduction into said index notch of an object to be grasped and movement of said object toward said pivotal connection causes said members to pivot from said closed position to a position where the object is introduced into the registering notches and grasped by said members, and means for pivoting said members out of said closed position, said means including a reciprocable wedge operatively associated with said members.

EDWARD CRANE.

References Cited in the file of this patent

UNITED STATES PATENTS

| Number | Name | Date |
|---|---|---|
| 925,993 | Chapman | June 22, 1909 |
| 1,166,382 | Morse | Dec. 28, 1915 |
| 1,742,569 | Barker | Jan. 7, 1930 |
| 2,035,948 | DeVout | Mar. 31, 1936 |
| 2,152,083 | Onorato et al. | Mar. 28, 1939 |
| 2,405,638 | Bilek | Apr. 13, 1946 |
| 2,435,706 | Barker | Feb. 10, 1948 |
| 2,448,421 | Davis | Aug. 31, 1948 |